United States Patent
Kamite et al.

(10) Patent No.: US 7,407,688 B2
(45) Date of Patent: Aug. 5, 2008

(54) PROCESS FOR RECYCLING WASTE FRP

(75) Inventors: Masayuki Kamite, Tokyo (JP); Masami Kato, Tokyo (JP)

(73) Assignee: Misawa Homes, Co., Ltd., Tokyo (JP)

( * ) Notice: Subject to any disclaimer, the term of this patent is extended or adjusted under 35 U.S.C. 154(b) by 651 days.

(21) Appl. No.: 10/938,307

(22) Filed: Sep. 10, 2004

(65) Prior Publication Data

US 2005/0110199 A1    May 26, 2005

(30) Foreign Application Priority Data

Sep. 11, 2003    (JP) .............................. 2003-319854

(51) Int. Cl.
*B05D 5/04* (2006.01)
*B05D 7/24* (2006.01)
*B28B 1/54* (2006.01)
*B29C 39/02* (2006.01)

(52) U.S. Cl. ................. 427/262; 427/265; 427/322; 264/132; 264/299

(58) Field of Classification Search .......... 427/262, 427/265, 322; 264/132, 299
See application file for complete search history.

(56) References Cited

U.S. PATENT DOCUMENTS 6,677,045 B1 *    1/2004    Meisenburg et al. ...... 428/424.2

FOREIGN PATENT DOCUMENTS

JP            11-070508       *    3/1999

* cited by examiner

*Primary Examiner*—Fred J. Parker
(74) *Attorney, Agent, or Firm*—Stephen M. De Klerk; Blakely, Sokoloff, Taylor & Zafman

(57) ABSTRACT

The present invention provides a process for recycling waste FRP which can simply and effectively reuse waste FRP. This process comprises the steps of mixing a cellulose fine powder derived from wood, a resin powder, and an FPR powder derived from waste FRP, to obtain a mixture; and melting and molding the mixture into a given shape to prepare a molded resin product containing 10-65% by weight of said cellulose fine powder, 25-40% by weight of said resin powder, and 10-30% by weight of said FPR powder on the basis of the mixture.

4 Claims, 2 Drawing Sheets

PROCESS FOR RECYCLING WASTE FRP

CROSS-REFERENCE TO RELATED APPLICATIONS

The present patent application claims priority from Japanese Patent Application No. 2003-319854, filed on Sep. 11, 2003.

TECHNICAL FIELD OF THE INVENTION

The present invention mainly relates to a process for recycling waste FRP of bath places, bath tubs, water-proof vessels, etc. in a bathroom.

BACKGROUND OF THE INVENTION

Bath places, bath tubs, and water-proof vessels, etc. in a bathroom usually use fiber-reinforced plastics (abbreviated as FRP hereinafter) as molding materials. However, such molded products are difficult to be broken down or burned off when they become waste products. The treatment of these waste products becomes a social problem, and therefore processes for effective recycling of the waste FRP have been researched in recent years.

It is known that there is a temperature difference between a first mold and a second mold. The molding material, which comprises thermosetting plastic resin and contains no waste FRP, freezes on the first mold at the high temperature side and a first layer forms by combining the first mold and the second mold. On the other hand, a molded resin product having a first layer and a second layer is prepared by coarsely crushing the frozen molded waste FRP into FRP coarse powder in advance, freezing the molding material obtained by incorporating a given amount of the FRP coarse powder into an unfrozen thermosetting resin on the first layer, and combining the molds (Refers to the patent literature 1-JP 8-244055). In addition, in the preparation of the second layer, the molding material containing FRP coarse powder is frozen and the molds are combined in the stage when the side of the second mold in the first layer has not fully frozen.

However, the process as disclosed in the above Patent Literature 1 for making the molded resin product has the disadvantage of too many procedures since a second molding procedure is needed which forms the second layer on the first layer using a molding material containing FRP coarse powder after preparing the first layer using the thermosetting plastic resin containing no FRP coarse powder before the first layer fully freezes. In addition, there exists the problem of the separation of the first layer from the second layer since different procedures are used in molding the two layers.

DISCLOSURE OF THE INVENTION

In order to overcome the drawbacks of the prior art, the object of the present invention is to provide a process for recycling waste FRP simply and effectively.

FIG. 1 is the schematic diagram showing the embodiment of the present invention and the device for making the molded resin product. As shown in FIG. 1, the invention of claim 1 of the present invention is characterized in that the process is a process for recycling waste FRP 4, wherein, the molded resin product is manufactured by mixing, melting, and molding mixture 8 containing wood-derived cellulose fine powder 3, resin-derived resin powder 7, and waste FRP 4-derived EPR powder 5, into a given form. The product contains 10-65% by weight of cellulose fine powder 3, 25-40% by weight of resin powder 7, and 10-30% by weight of EPR powder 5 on the basis of mixture 8.

By using one embodiment of the present invention, it is possible to effectively recycle waste FRP 4 which is hard to dispose, favoring the effective utilization of resources and protection of environment since the product contains 10-65% by weight of cellulose fine powder 3, 25-40% by weight of resin powder 7, and 10-30% by weight of EPR powder 5 on the basis of mixture 8.

Furthermore, different from the prior art, that is, FRP powder 5 and the other materials are molded separately, FRP powder 5 is firstly mixed with cellulose fine powder 3 and resin powder 7, and then the mixture is made into a given form, so the molded resin product is made in one step and the execution is simplified.

In addition, a molded resin product with a wood feeling can be made since the product contains cellulose fine powder 3 obtained from wood.

The reason why mixture 8 contains 10-65% by weight of cellulose fine powder 3 is that less than 10% of cellulose fine powder is hard to exhibit a wood-like appearance such as wood feeling, but more than 65% of cellulose fine powder would worsen the molding performance of the molded resin product due to too much cellulose fine powder 3.

The reason why mixture 8 contains 25-40% by weight of resin powder 7 is that less than 25% of resin powder makes it hard to mix due to the too much cellulose fine powder and FRP powder, but more than 40% of resin powder 7 would worsen the molding performance of the molded resin product due to the difficulty in melting.

The reason why mixture 8 contains 10-30% by weight of FRP powder 5 is that less than 10% of FRP powder 5 makes it hard to raise the reuse rate of waste FRP 4, but more than 30% of FRP powder 5 would worsen the molding performance of the molded resin product due to the difficulty in melting.

As waste FRP 4, waste products in a bathroom such as the floor, wall, and water-proof vessel, etc. can be used.

In one embodiment of the present invention, in the process for recycling waste FRP 4, the resin is waste resin 6 made from polypropylene resin and packing film 6 made from polyolefin resin.

The use of this embodiment is good for the effective utilization of resources and protection of environment even only in view that the resin is waste resin 6 made from polypropylene resin and packing film 6 made from polyolefin resin, and therefore waste resin and packing film can be reused.

In one embodiment of the present invention, in the process for recycling waste FRP 4, the wood is waste wood containing impurities.

This embodiment is good for the effective utilization of resources and protection of environment since impurity-containing waste wood 2 is used.

Waste wood 2 includes the waste wood thrown away when buildings like houses and so on are disaggregated, waste wood thrown away when furniture is disaggregated, and wood head and scraps thrown away in civil engineering, etc.

In one embodiment of the present invention in the process for recycling waste FRP 4, the surface of the molded resin product is treated by flame for oxidation after treatment with silane.

The use of this embodiment can enhance the bonding property of the surface of the molded resin product and thereby improve the quality of finishing processing in the following procedures of printing wood grain patterns and coat-decorating In one embodiment of the present invention in the process for recycling waste FRP 4, wood grain patterns are printed on the surface of the molded resin product after flame treatment.

The use of this embodiment can improve the apparent quality of the molded resin product since wood grain patterns are printed on the surface of the molded resin product after flame treatment and therefore the hard FRP particles easily appearing on the surface of the molded resin product do not draw people's attention.

In one embodiment of the present invention, in the process for recycling waste FRP 4, the surface of the molded resin product whereon said wood grain patterns are printed is subjected to UV coating-decorating, and after coarsening, the surface is subjected to UV coating-decorating again.

This embodiment can enhance the compactness of the secondarily formed UV coating and form a UV coating with a certain thickness since the surface of the molded resin product whereon said wood grain patterns are printed is subjected to primary UV coating-decorating to form a UV coating with a certain thickness, and after coarsening, the surface is subjected to aforesaid UV coating-decorating again. Therefore, the product possesses an excellent water-resistant property and suits, for example, the application as a material for the floor and wall of bath place.

The process for recycling waste FRP of the present invention can effectively reuse waste FRP which is hard to dispose, and is good for effective utilization of resources and environment protection since the product contains 10-65% by weight of cellulose fine powder, 35% by weight of resin powder, and 10-30% by weight of EPR powder on the basis of the mixture.

Furthermore, the process is good for execution compared to the prior art since it can make the molded resin product in one step by molding the mixture containing FRP into a given form. In addition, the process can make molded resin products with wood feeling since the product contains cellulose fine powder.

ILLUSTRATION OF THE LABEL IN THE DRAWINGS

Figure 1:
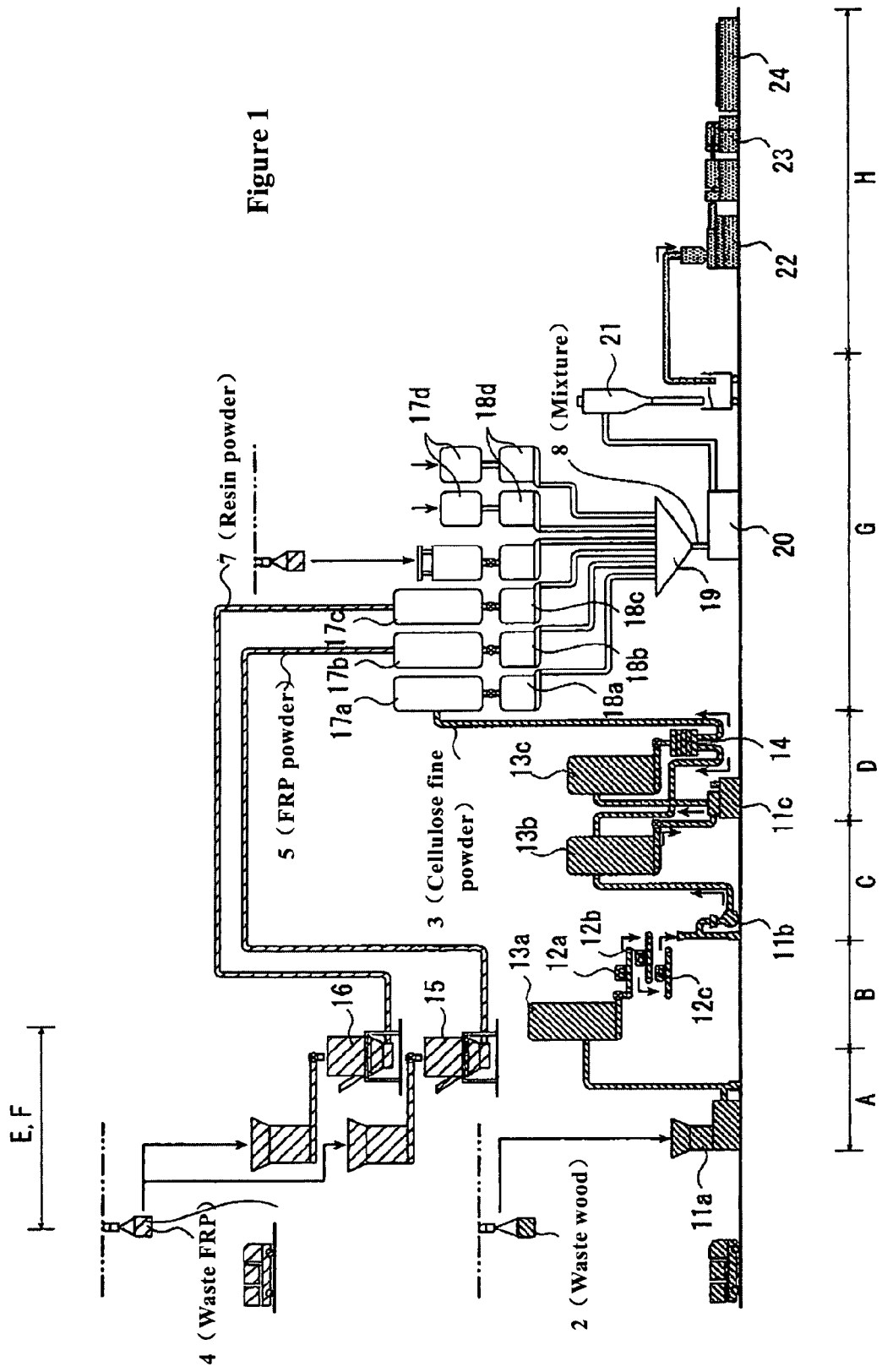
FIG. 1 is the schematic diagram showing the embodiment of the present invention and the device for making the molded resin product.

2 Waste wood
3 Cellulose fine powder
4 Waste FRP
5 FRP powder
6 Waste resin
7 Resin powder
8 Mixture

EMBODIMENT FOR CARRYING OUT THE INVENTION

The embodiment of the present invention will be illustrated below.

Figure 2:
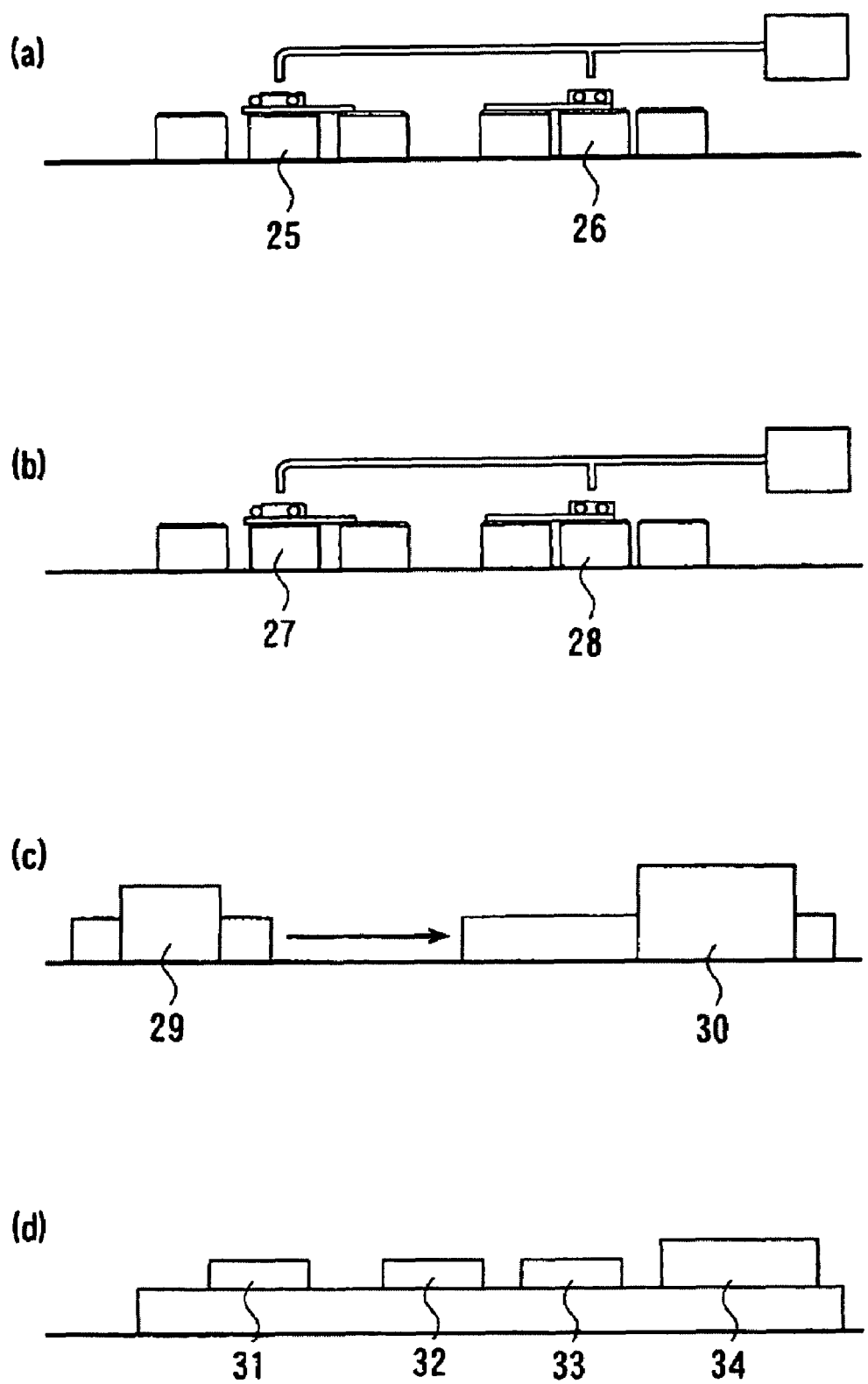
FIG. 2 is the same as FIG. 1, and FIG. 2(a)-FIG. 2(d) are the diagrams of the device for making the molded resin product.

FIGS. 1 and 2 are the schematic diagrams of the apparatus for making the molded resin product used in the process for recycling waste FRP of the present invention.

In the present embodiment, the apparatus 1 used in the process for recycling waste FRP 4 shown in FIG. 1 for making the molded resin product is illustrated.

Apparatus 1 for making the molded resin product is equipped with wood crushing means (crushing devices 11a, 11b, and 11c), FRP powder crushing means (crushing device 15), resin crushing means (crushing device 16), mixing-melting means (mixing funnel 19, pelletizer 20), and molding means (extruder 22); said wood crushing means (crushing devices 11a, 11b, and 11c) provides cellulose fine particles 3 by crushing waste wood 2; said FRP crushing means (crushing device 15) provides FRP fine powder 5 by crushing waste FRP 4; said resin crushing means (crushing device 16) provides resin powder 7 by crushing waste resin 6; said mixing-melting means (mixing funnel 19, pelletizer 20) makes mixture 8 by mixing and then melting cellulose fine particles 3, FRP fine powder 5, and resin powder 7; said molding means (extruder 22) makes mixture 8 into a given form.

Firstly, waste wood 2 with a size of 4-5 cm is crushed into particles with a size of several millimeter using such apparatus 1 for making molded resin products (primary wood crushing procedure A).

Waste wood 2 includes waste wood thrown away when buildings like houses, etc are disaggregated, waste wood thrown away when furniture is disaggregated, and wood head and scraps thrown away in civil engineering.

The crushing device (wood crushing means) 11a used in primary wood crushing procedure A is a crushing device able to crush massive wood into particles with a size of several millimeter, in particular, crushing device 11a has many bulges on the surface of its two opposite rollers and crushes the material passing through the gap between the rollers by pressurizing the rollers while they are rotating. Crushing device 11a is certainly not limited to such a device, and other coarsely crushing devices with the same function can also be used. For example, jaw crushers can also be used wherein the feed is placed between a clamp and a vibrating jaw forming an upward V-shape opening and crushed by pressurizing. Other coarsely crushing devices such as a continuous rotary crusher can also be used wherein a movable crushing face rotates in a fixed crushing face.

Then the crushed waste wood 2 is sent to wood powder storage tank 13a. The metals which can adsorb on magnets, stainless steel, and nonferrous metals which possess conductivity but do not adsorb on magnets are removed from waste wood 2 stored in wood powder storage tank 13a with iron-removing machine 12a having strong magnets, stainless steel separator 12b, and nonferrous metal separator 12c respectively (separation procedure B).

Then, the primarily crushed material (waste wood 2) which has passed through the primary wood crushing procedure and metal removing step is crushed into fine powder in secondary wood crushing procedure C. The crushing device 11b used in the second wood crushing procedure C (wood crushing means) is a device able to crush massive materials into fine powder with a size of about 1 mm, in particular, it is a hammer crusher which uses fast rotating hammer picks to repeatedly crush the material until the material passes through the circular sieve holes around the hammer tips. Crushing device 11b is certainly not limited to the aforesaid hammer crusher, and it can be other crushing devices with the same function. For example, it can be a cutter which uses cutting knives for crushing, or a roll-type crusher which crushes the material by the press of the rollers.

Then, the secondarily crushed material (waste wood 2) which has passed through the second crushing procedure C is sent to the wood powder storage tank 13b.

The secondarily crushed material stored in storage tank 13b is made into cellulose fine powder 3 by crushing. Crushing device 11c used in the third wood crushing procedure (wood crushing means) D is a device able to crush the material obtained in the second wood crushing procedure C into still finer powder.

In particular, the so called pin-type crusher is a device able to carry out crushing by the action of impact and rebound of the pins equipped on a disc. More particularly, the pin-type crusher is equipped with a rotary disk with many needles in the upward vertical direction, and a fixed disc facing the rotary disk and having many pins. The material obtained in the second crushing procedure C is fed to the center of the rotary disc, thrown into the gaps among the pins installed on the rotary and fixed discs by the centrifugal force, subjected to the action of impact and rebound of the pins, and thus crushed into fine powder. In the third wood crushing procedure D, the material is crushed into particles with a size about 300 μm. Crushing device 11c is certainly not limited to pin-type crushers, other finely crushing devices having the same crushing function such as ball-type crushers and stone mortars can also be used.

In the aforesaid wood crushing procedures A, B, and C, the recovered waste wood 2 is crushed in three stages, and thus the recovered waste wood 2 is crushed stagewise and effectively.

Cellulose fine powder 3 passing through the third crushing procedure D is then sent to wood powder storage tank 13c, and screened with a sieve of 300 μm to obtain particles with an average diameter of 300 μm.

That is to say, after screening cellulose fine powder 3 with sieve 14, the fine powder bigger than 300 μm returns to crusher 11c for crushing again, while that smaller than 300 μm is sent to subsequent wood measuring tank 17a for storage.

On the other hand, waste FRP 4 is crushed into FRP powder 5 with an average diameter less than 50 mm using FRP crushing means 16 (waste FRP crushing procedure E).

That is to say, waste FRP crushing procedure E has the same procedures as the first wood crushing procedure A, the second wood crushing procedure C, and the third wood crushing procedure D using the same crushers as crushers 11a, 11b, and 11c. The illustration of FRP crushing procedure E is omitted because it is the same as the crushing procedures A, C, and D.

The wastes such as the floor and wall, bath tub, water-proof vessel in a bathroom can be used as waste FRP 4.

The obtained FRP 5 is then stored in FRP measuring tank 17b.

Waste resin 6 is crushed into resin powder 7 with an average diameter less than 3 mm using resin crushing means 18 (resin crushing procedure F).

That is to say, the resin crushing procedure F has the same procedures as the first wood crushing procedure A, the second wood crushing procedure C, and the third wood crushing procedure D using the same crushers as crushers 11a, 11b, and 11c. The illustration of resin crushing procedure F is also omitted.

The waste products derived from packing film coated for maintaining the surface of bath tub, food vessels and packing of drinks, and trays, etc. can be used as waste resin 6.

The film using olefin resin as raw material is preferred. The waste food vessels and packing and trays using polypropylene resin, polyvinyl chloride resin, polyethylene resin, foaming vinyl chloride resin, polystyrene resin, or ABS resin as raw materials are preferred. The waste using polypropylene resin as raw material is most preferred.

Obtained resin powder 7 is then stored in resin measuring tank 17c.

Afterwards, cellulose fine powder 3 stored in wood measuring tank 17a, FRP powder 5 stored in FRP measuring tank 17b, and resin powder 7 stored in resin measuring tank 17c are charged into mixing funnel (mixing-melting means) 19 through corresponding measuring instruments 18a-18c installed on the corresponding measuring tanks 17a-17c. At this time, the pigment, hardening agent, lubricant such as acid-modified polyolefin's and so on, stored in storage tank 17d of auxiliary materials are also charged into mixing funnel 19 through individual measuring instrument 18d. Various materials are mixed and molten to yield uniform mixture 8 (mixing procedure G).

On the basis of mixture 8, 10-65% by weight of cellulose fine powder 3, 10-30% by weight of FRP powder, 25% by weight of polypropylene resin 7, 10% by weight of film powder 7, 9% by weight of pigment, 0.5% by weight of hardening agent, 3% by weight of lubricant are charged into mixing funnel 19 after measuring with corresponding measuring instruments 18a-18d.

Differing from batch measuring instruments, measuring instruments 18a-18d of the present embodiment are continuous measuring instruments which continuously measure various materials and charge them into mixing funnel 19. Batch measurement is that various measuring tanks feed the materials to corresponding measuring instruments until the amount reaches a given value, and then the materials are charged into the mixing funnel. The continuous measurement of the present embodiment is to continuously feed various materials to corresponding measuring instruments 18a-18d from corresponding measuring tanks 17a-17d and then to mixing funnel 19 in a given proportion.

Various materials are charged into mixing funnel 19 in a given proportion by using such a continuous measuring mode, therefore, particles can be continuously made in the following procedure and the productivity can be raised.

Afterwards, mixture 8 in mixing funnel 19 is charged into pelletizer (mixing-melting means) 20, which extrudes and molds mixture 8 from the mold while precisely cutting it into particles with a given size, and then the particles are cooled. Besides, the lead screw in the cylinder of pelletizer 20 is double-shaft type, able to uniformly mix and melt mixture 8.

The obtained particles are then charged into the funnel of extruder (molding means) 22 through cyclone 21, extruded using the lead screw in the cylinder while being heated in the cylinder, and then extruded from the mold at the front end of the cylinder and made into the molded resin product with a given form (molding procedure H).

In the molding procedure H, it is desired that the molding temperature is set at 160-220° C., preferably at 170-185° C. The reason why the molding temperature is set at 160-220° C. is that resin powder 7 can not fully soften at a temperature below 160° C. and therefore is hard to uniformly mix with cellulose fine powder 3, but some changes like carbonization, etc. would take place if the molding temperature exceeds 220° C.

Because the molding temperature is set at 160-220° C., cellulose fine powder 3 obtained in wood crushing procedures A, C, and D does not change by heat, and resin powder 7 can fully soften and uniformly mix with cellulose fine powder 3 in molding procedure H.

Besides, it is desired that extruder 22 is equipped with two molds. Two molds make it possible to make two molded resin products once, and thereby the productivity can be raised.

The molded resin product extruded from the mold is drawn by drawing machine 24 and cut into a given length by cutter 24.

The molded resin product made in the way as described above should be subjected to surface treatment.

The surface treatment will be illustrated below referring to FIGS. 2(a)-2(d).

As shown in FIG. 2(a), the form of the molded resin product is regulated using setting machine 25 first. Setting machine 25 is equipped with an opening having roughly the same form as the outline of the molded resin product to be molded and an inner diameter equal to the outer diameter of the same to finish the cross-sectional form and size of the molded resin product by inserting the molded resin product into the opening.

The finished molded resin product is then chamfered with chamfering machine 26 and then polished with abrasive paper as shown in FIG. 2(b) to form many lines on the surface of the molded resin product by coarsening. It is desired that the surface of the molded resin product is first abraded with coarse abrasive paper (e.g. 120# abrasive paper), and then abraded with fine abrasive paper (e.g. 180# abrasive paper).

The molded resin product is then cut into a given length with cutter 28 while following the moving of the molded resin product.

As shown in FIG. 2(c), the molded resin product molded by cutting with cutter 28 is then coat-decorated with roller coating machine 29, and then charged into drying oven 30 for drying.

Afterwards, as shown in FIG. 2(d), the surface of the molded resin product is firstly treated in silane treatment machine 31 using, for example, silane such as organic siloxane, and then subjected to flame treatment with flame treating machine 31 (flame treating).

The so called flame treatment is to bond the coat with the molded resin product and directly bake the surface of the molded resin product for oxidation with the flame of a gas inflamer.

Wood grain patterns can be printed on the surface of the flame treated molded resin product using printing machine 32. At this time, wood grain patterns are firstly printed on the surface of the flame treated molded resin product, and then the practical application part is printed. It is desired that the printing is completed in two steps.

Afterwards, the surface of the molded resin product is coated with a UV coating using vacuum coating-decorating machine 33, and then dried in UV drying oven 34. The dried surface of the molded resin product is polished for coarsening, coated with UV coating once again using vacuum coating-decorating machine 33, and dried in UV drying oven 34.

Vacuum coating-decorating machine 33 is equipped with a vacuum chamber which has an inlet part and an outlet part for the molded resin product to be coating-decorated to pass through. The molded resin product is impregnated with coating in the chamber, and the unwanted coat is removed at the outlet part to form a specified coating-decorated film.

It is desired that the thickness of the first coating layer is about 60 μm and that of the second coating layer is about 30 μm.

The UV coating used includes, for example, photopolyacrylate, etc.

The embodiment for carrying out the process for recycling waste FRP 4 of the present invention can effectively reuse waste FRP 4 which is hard to dispose and therefore is good for effective utilization of resources and environment protection because the product contains 10-65% by weight of cellulose fine powder 3, 35% by weight of resin powder 7, and 10-30% by weight of EPR powder 5 on the basis of mixture 8.

In addition, compared to the prior art, the embodiment for carrying out the process for recycling waste FRP 4 of the present invention is good for execution because mixture 8 of FRP powder 5, cellulose fine powder 3, and resin powder 7 are made into a given form and thus the molded resin product can be made in one step. In addition, a molded resin product with wood feeling can be made because it contains cellulose fine powder 3.

The embodiment for carrying out the process for recycling waste FRP 4 of the present invention is good for effective utilization of resources and environment protection even only in view of that the resin material is waste resin 6 made from polypropylene resin and the wood is impurity-containing waste wood 2.

In addition, the bonding property is enhanced because the surface is oxidized by the flame treatment following the silane treatment, therefore the quality of the finishing processing in the following procedures, i.e., wood grain printing and coat-decorating, can be improved.

In addition, the apparent quality of the molded resin product can be improved because wood grain patterns are printed on the surface of the molded resin product after the flame treatment, and thereby the hard FRP particles easily appearing on the surface of the molded resin product do not draw people's attention.

The compactness of the secondarily formed UV coating can be enhanced and a UV coating with a certain thickness can be formed because the surface of the molded resin product, whereon aforesaid wood grain patterns have been printed, is subjected to UV coating-decorating, and after coarsening, the surface is subjected to UV coating-decorating again. The UV coating with a certain thickness endows the product with an excellent water-resistant property and makes it applicable in building floor and wall of bath place of a bathroom The present invention is not limited to the aforesaid embodiment, and adequate changes can be made within the scope of the spirit and disclosure of the present invention.

In the present embodiment, cellulose fine powder 3 is obtained from but not limited to waste wood 2, and it can also be, for example, the materials obtained by crushing wood, bagasse, and rice straw, etc.

The surface processing is not limited to the aforesaid process, and adequate changes can be made. For example, embossing processing can be used to form grooves on the surface of the molded resin product.

What is claimed is:

1. A process for recycling waste FRP, comprising mixing a cellulose fine powder having a diameter smaller than 300 μm derived from wood, a resin powder, and an FPR powder derived from waste FRP materials, to obtain a mixture; and melting molding the mixture into a given shape to prepare a molded resin product containing 10-65% by weight of said cellulose fine powder, 25-40% by weight of said resin powder, and 10-30% by weight of said FPR powder on the basis of the mixture.

2. The process for recycling waste FRP as claimed in claim 1, wherein the resin is the waste resin made from polypropylene resin and packing films made from polyolefin resin.

3. The process for recycling waste FRP as claimed in claim 1, wherein the surface of the molded resin product is treated with flame for oxidation after a silane treatment.

4. The process for recycling waste FRP as claimed in claim 3, wherein wood grain patterns are printed on the surface of the flame-treated molded resin product.

* * * * *